(12) United States Patent
Todd et al.

(10) Patent No.: US 8,191,084 B1
(45) Date of Patent: May 29, 2012

(54) TECHNIQUES FOR SUPPORTING APPLICATION OPERATION

(75) Inventors: Stephen J. Todd, Shrewsbury, MA (US); Andreas L. Bauer, Boxborough, MA (US); Gerald E. Cotter, Hopkinton, MA (US); Douglas A. Wood, Westford, MA (US)

(73) Assignee: EMC Corporation, Hopkinton, MA (US)

( * ) Notice: Subject to any disclaimer, the term of this patent is extended or adjusted under 35 U.S.C. 154(b) by 1278 days.

(21) Appl. No.: 11/864,040

(22) Filed: Sep. 28, 2007

(51) Int. Cl.
*G06F 3/00* (2006.01)
*G06F 9/44* (2006.01)
*G06F 9/46* (2006.01)
*G06F 13/00* (2006.01)

(52) U.S. Cl. .......... 719/320; 711/162; 711/170
(58) Field of Classification Search .......... 711/170; 719/320
See application file for complete search history.

(56) References Cited

U.S. PATENT DOCUMENTS

| | | | |
|---|---|---|---|
| 6,128,016 A | 10/2000 | Coelho et al. | |
| 6,567,937 B1* | 5/2003 | Flores et al. | 714/46 |
| 6,609,184 B2* | 8/2003 | Bradshaw et al. | 711/162 |
| 7,072,934 B2 | 7/2006 | Helgeson et al. | |
| 7,140,014 B2 | 11/2006 | Coryell et al. | |
| 7,376,671 B2 | 5/2008 | Simpson | |
| 7,899,662 B2* | 3/2011 | Brunet et al. | 703/24 |
| 2006/0101059 A1* | 5/2006 | Mizote et al. | 707/102 |
| 2006/0184937 A1* | 8/2006 | Abels et al. | 718/1 |
| 2006/0212594 A1* | 9/2006 | Haner et al. | 709/232 |
| 2007/0244940 A1* | 10/2007 | Devarakonda et al. | 707/205 |
| 2008/0065993 A1* | 3/2008 | Huang | 715/745 |
| 2008/0082777 A1* | 4/2008 | Sakaguchi et al. | 711/170 |
| 2011/0023133 A1* | 1/2011 | Trevathan et al. | 726/30 |

* cited by examiner

*Primary Examiner* — Diem Cao
(74) *Attorney, Agent, or Firm* — BainwoodHuang (57) ABSTRACT

A technique supports application operation. The technique involves discovering a set of applications running on an electronic system, and querying a user to identify which of the set of applications the user wishes to manage. The technique further involves, for each application identified by the user, providing an application service to that application to support operation of that application, the application service being separate from operating system services and security protection services provided by the electronic system.

20 Claims, 8 Drawing Sheets

TECHNIQUES FOR SUPPORTING APPLICATION OPERATION

BACKGROUND

In general, a server is a computer that services requests from one or more client computers linked by a network. For instance, a SQL server is a specialized computer that provides database access in response to SQL-coded client requests. Similarly, a web server is a specialized computer that provides web pages in response to web page requests.

The principal component to such a server is its specialized server application. Such an application typically includes a complex set of programs, configuration information, and data files, among other things. Additionally, such an application typically imposes a stringent set of minimal computer requirements to operate properly. Microsoft SQL Server® offered by Microsoft Corporation of Redmond, Wash. is an example of a SQL application. Apache HTTP Server offered by the Apache Software Foundation of Forest Hill, Md. is an example of a web server application. Microsoft Exchange Server® offered by Microsoft Corporation is an example of a messaging and collaborative software application.

The underlying hardware and operating system provide resources (e.g., compute time, memory, bandwidth, data storage, etc.) that enable the server application to achieve its various functions. For certain security protection services that the server application or operating system is otherwise incapable of otherwise obtaining (e.g., specialized anti-virus protection, firewall protection, and spam filtering), an independent application can be added to the server to provide those services.

SUMMARY

Unfortunately, there are drawbacks to supporting the operation of conventional servers. For example, the management of such servers (memory allocation, RAID level implementation, backup procedures, etc.) typically requires the involvement (time, an eye for detail, etc.) of trained and experienced technicians. Often, such a technician may be skilled and well-versed on managing operation of a particular server application, but lack important training to manage other server applications running on the same or adjacent computer systems.

Furthermore, even when such talent is available, certain application service tasks such as migration of the data to a new platform, or scaling up on an existing platform (e.g., adding more storage capacity or processing power) often becomes difficult as additional hardware comes into play and key information changes location. Moreover, such tasks are typically too much to expect the server's operating system to handle in an automated manner since the new hardware may be independent of the original server hardware. Similarly, such tasks are too complex to expect any additional security protection service software to handle since such software is specialized to handle just security protection. Additionally, such tasks are often too complex to expect the server application itself to handle since the server application typically runs at a high level without direct control over particular system configuration aspects such as throughput, memory allocation, RAID level implementation, or perhaps even backup procedures, among others.

In contrast to the above-described deficiencies to supporting the operation of conventional servers, an improved technique for supporting application operation is carried out separately from the conventional operating system services and security protection services traditionally found in a server. In particular, from a distinct application services platform, application support tasks such as application discovery, provisioning, and management are capable of being carried out. Such application awareness and control is preferably presented to a user as an integrated, unified user interface which can concurrently oversee the life cycle of multiple applications.

One embodiment is directed to a method for supporting application operation. The method includes discovering a set of applications running on an electronic system, and querying a user to identify which of the set of applications the user wishes to manage. The method further includes, for each application identified by the user, providing an application service to that application to support operation of that application, the application service being separate from operating system services and security protection services provided by the electronic system.

BRIEF DESCRIPTION OF THE DRAWINGS

The foregoing and other objects, features and advantages will be apparent from the following description of particular embodiments of the invention in conjunction with the accompanying drawings in which like numerals indicate like structural elements and features in the various figures. The drawings are not necessarily to scale, emphasis instead being placed upon illustrating the principles of various embodiments of the invention.

DETAILED DESCRIPTION

An improved technique for supporting application operation is carried out separately from the conventional operating system services and security protection services traditionally found in a traditional server. In particular, application support tasks such as application discovery, provisioning, and management are capable of being carried out from a distinct application services platform. Such application awareness and control is preferably presented to a user as an integrated, unified user interface which can concurrently oversee the life cycle of multiple applications.

Figure 1:
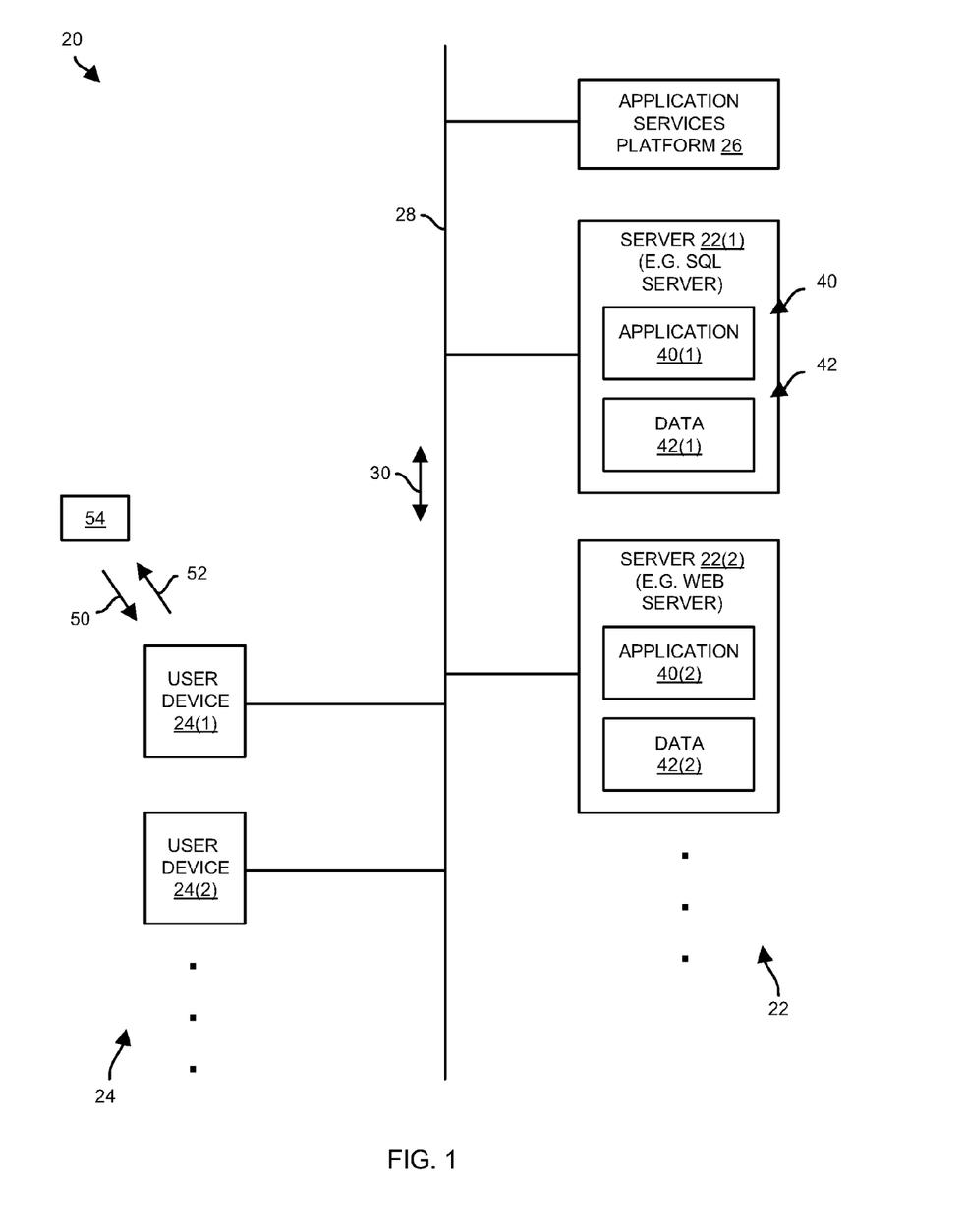
FIG. 1 is a block diagram of an electronic system having a distinct application services platform from which to carry out application support tasks.

FIG. 1 shows an electronic system 20 which utilizes a distinct application services platform from which to carry out application support tasks and enable application operation. The electronic system 20 includes a set of servers 22(1), 22(2), . . . (collectively, servers 22), a set of user devices 24(1), 24(2), . . . (collectively, user devices 24), an application services platform 26, and a communications fabric 28. The communications fabric 28 conveys signals 30 among the various computerized devices 22, 24, 26 of the system 20.

It should be understood that the communications fabric 28 is illustrated as having a backbone topology by way of example only. The communications fabric 28 may include a variety of media (e.g., copper wire, fiber optic cable, wireless medium, related data communications devices, combinations thereof, etc.) and other devices (e.g., network nodes, firewalls, routers, switches, bridges, gateways, etc.). Additionally, the communications fabric may have other topologies (e.g., hub and spoke, point-to-point, loops, irregular, combinations thereof, and so on).

Each server 22 includes a server application 40 (i.e., software running on one or more processors) and server data 42 (i.e., configuration information, transactional data, records, files, etc.). In particular, the server 22(1) includes a server application 40(1) and server data 42(1). Similarly, the server 22(2) includes a server application 40(2) and server data 42(2), and so on. It should be understood that each server 22 is further capable of having multiple server applications 40 and corresponding server data 42.

Each user device 24 is a client-style device such as a laptop, a computer workstation, a smart phone or appliance, and so on. The user devices 24 are arranged to obtain services from the servers 22. By way of example, the server 22(1) is a SQL server which provides access to a set of databases, and the server 22(2) is a web server which provides access to a set of websites.

During operation, the application services platform 26 is configured to receive input 50 from and provide output 52 to a user 54 (also see the signals 30 through the communications fabric 28). The input 50 is preferably in the form of a set of commands, data, and configuration information obtained through input equipment, e.g., a keyboard and a mouse. The output 52 is preferably in the form of text and graphical information presented to the user through a display (e.g., a web page on a web browser, a graphical user interface, etc.). To this end at least one of the user devices 24 (e.g., the user device 24(1)) is capable of operating as an input/output (I/O) device which enables the user 54 to control and operate the application services platform 26 in an interactive manner. Alternatively, the user can use a dedicated console (e.g., an I/O terminal directly connected to the application services platform 26) to provide the input 50 to and receive the output 52 from the application services platform 26.

In response to such user interaction, the application services platform 26 is arranged to carry out a variety of application support tasks such as application discovery, provisioning, and monitoring. Such operation, which will be discussed in further detail shortly, allows the underlying platforms of the servers 22 (e.g., the hardware and operating systems) to continue to reliably run their server software without being significantly taxed by having to directly perform the application support tasks as well. For example, suppose that the server 22(1) is nearing its throughput and storage limitations. Rather than burden the server 22(1) with having to run additional software to carryout the application support tasks which may be otherwise impossible due to the server's limitation, the applications support tasks can be freely carried out by the application services platform 26 in an unconstrained manner. Accordingly, the application services platform 26 reliably and robustly facilitates and enables application operation. Further details will now be provided with reference to FIG. 2.

Figure 2:
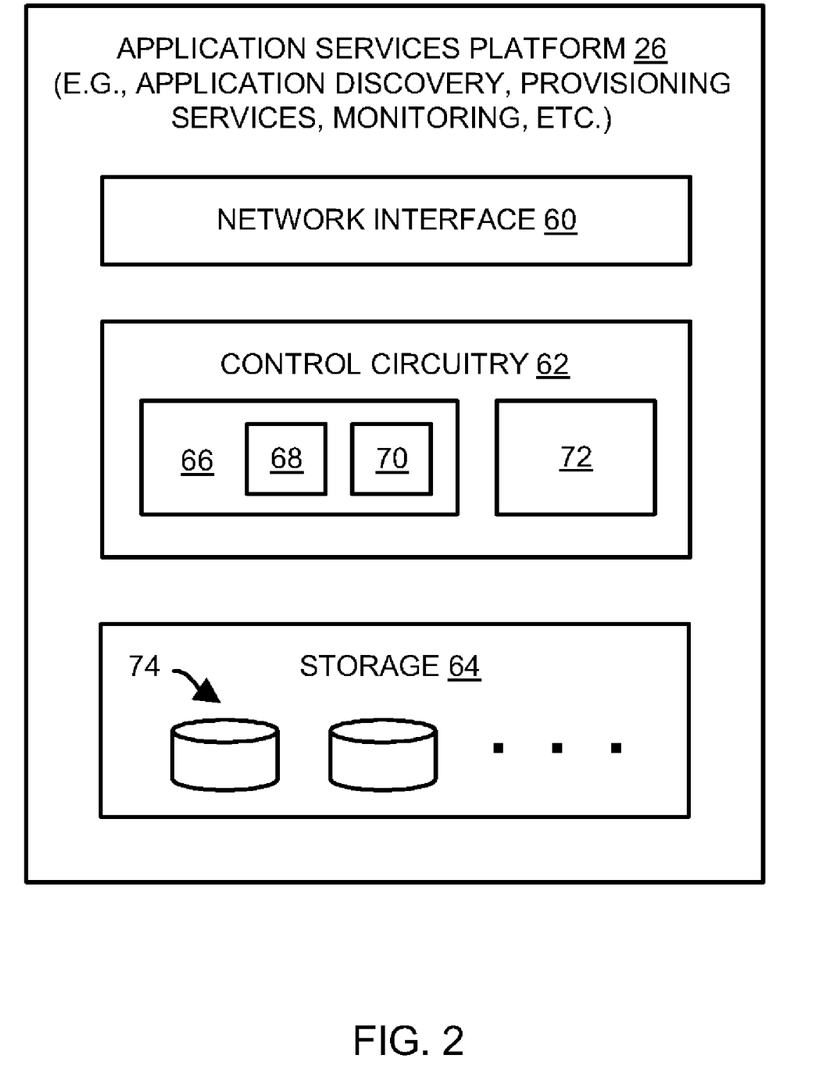
FIG. 2 is a block diagram of the application services platform of FIG. 1.

FIG. 2 shows particular details of the application services platform 26. As shown, the application services platform 26 includes a network interface 60, control circuitry 62 and storage 64. The network interface 60 is arranged to provide the application services platform 26 with connectivity to the communications fabric 28 of the electronic system 20 (e.g., access to a computer network). The control circuitry 62 includes (i) memory 66 which stores a specialized application 68 and other information 70 (e.g., application profile information) and (ii) a set of processors 72 which runs the application 68 in order to perform the application support tasks. The storage 64 includes a set of storage devices 74 (e.g., disk drives, flash memory drives, cache memory, etc.) to provide additional storage capacity which is available to the applications 40 running on the servers 22.

In some arrangements, the application services platform 26 is an enhanced storage array which conveniently provides high-throughput (e.g., reliable write caching), load balancing (multiple storage processors), fault tolerance (component redundancy), and data recovery (RAID with hot standby devices). For example, the enhanced storage array is adapted to provide application services to applications thus robustly and reliably enabling application operation. In some arrangements, the memory 66 and the storage 64 reside together physically but are allocated to the control circuitry 62 and the storage 64 in a predefined manner, e.g., using address partitions.

At this point, it should be understood that the application services platform 26 is equipped with both computer throughput power and storage capacity, and is capable of sharing this processing power and storage capacity with one or more of the servers 22 to improve operation of the electronic system 20 as a whole. Accordingly, the application services platform 26 enjoys the ability to provide application services and enable application operation beyond the limited conventional operating system services and security protection services offered by the individual servers 22 to their respective applications 40. Particular operational details of the application services platform 26 will now be provided with reference to FIG. 3.

Figure 3:
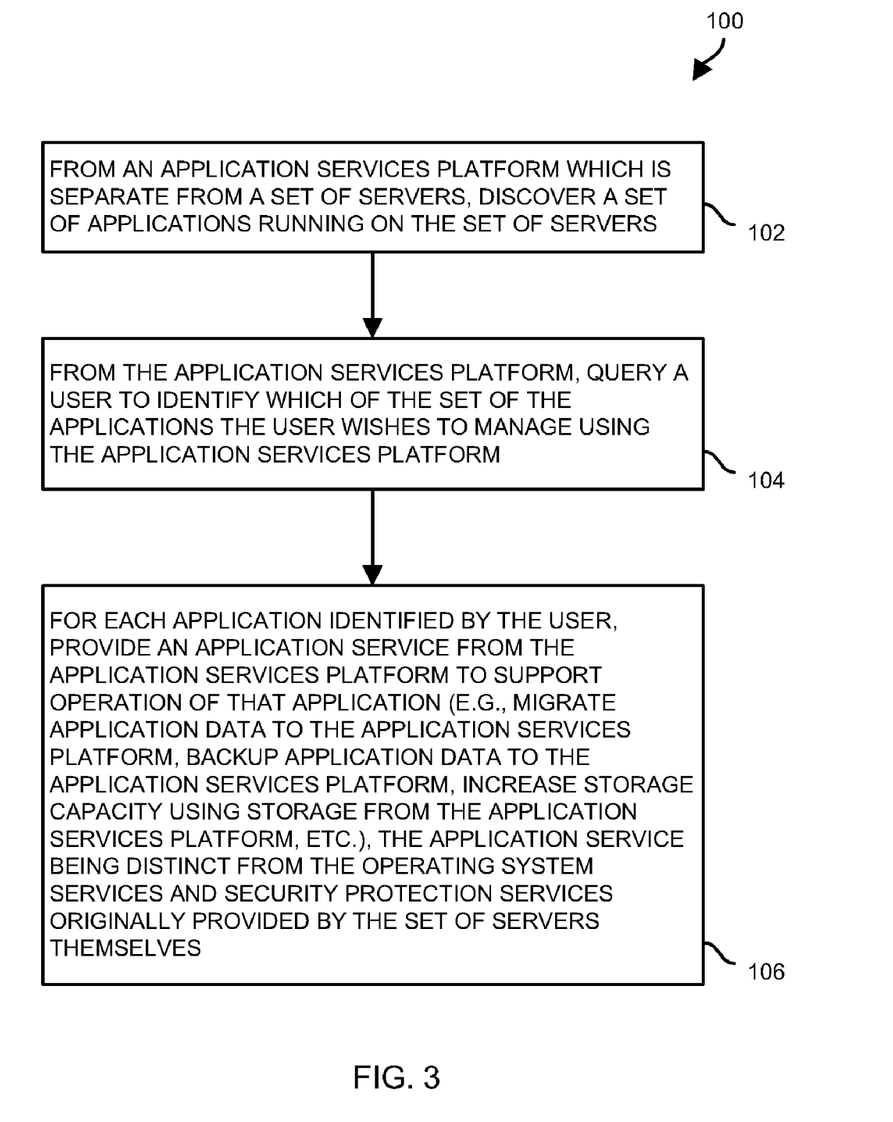
FIG. 3 is a flowchart illustrating a procedure carried out by the application services platform of FIG. 2.

FIG. 3 shows a procedure 100 which is performed by the control circuitry 62 of the application services platform 26. In step 102, the control circuitry 62 discovers a set of applications 40 running on the set of servers 22. In some arrangements, such discovery is automatically triggered upon powering up and connecting the application services platform 26 to the communications fabric 28. Such discovery is capable of being carried out transparently by monitoring communications (e.g., see the exchanged signals 30 in FIG. 1) on the communications fabric 28 without hindering routine operation of the servers 22 on the electronic system 20. A similar technique is described in U.S. application Ser. No. 11/906,160 filed on Sep. 28, 2007, entitled "TECHNIQUES FOR AUTOMATED APPLICATION DISCOVERY", the teachings of which are hereby incorporated by reference in their entirety.

In step 104, the control circuitry 62 queries the user to identify which of the set of applications 40 the user wishes to manage. In this step, the user does not need to immediately manage all of the applications 40 using the application services platform 26. Rather, the user is capable of selecting applications 40 to manage and thus incrementally enhancing the operation of the electronic system 20 on an application-by-application basis. Along these lines, the user simply re-enters the procedure 100 to select a new application 40 that the user did not select during a previous iteration.

In step 106, for each application 40 identified by the user, the application services platform 26 provides an application service to that application 40 to support operation of that application 40. Such application services can be of a form that is beyond the operating system services and security protection services provided by the set of servers 22. For example, the application services platform 26 is capable of migrating either the application 40, the application data 42 or both to the application services platform 26. As another example, the application services platform 26 is capable of backing up either the application 40, the application data 42 or both to the application services platform 26. As yet another example, the application services platform 26 is capable of augmenting the storage capacity for the application data 42 using the storage 64 of the application services platform 26. Further details will now be provided with reference to FIGS. 4 and 5.

Figure 4:
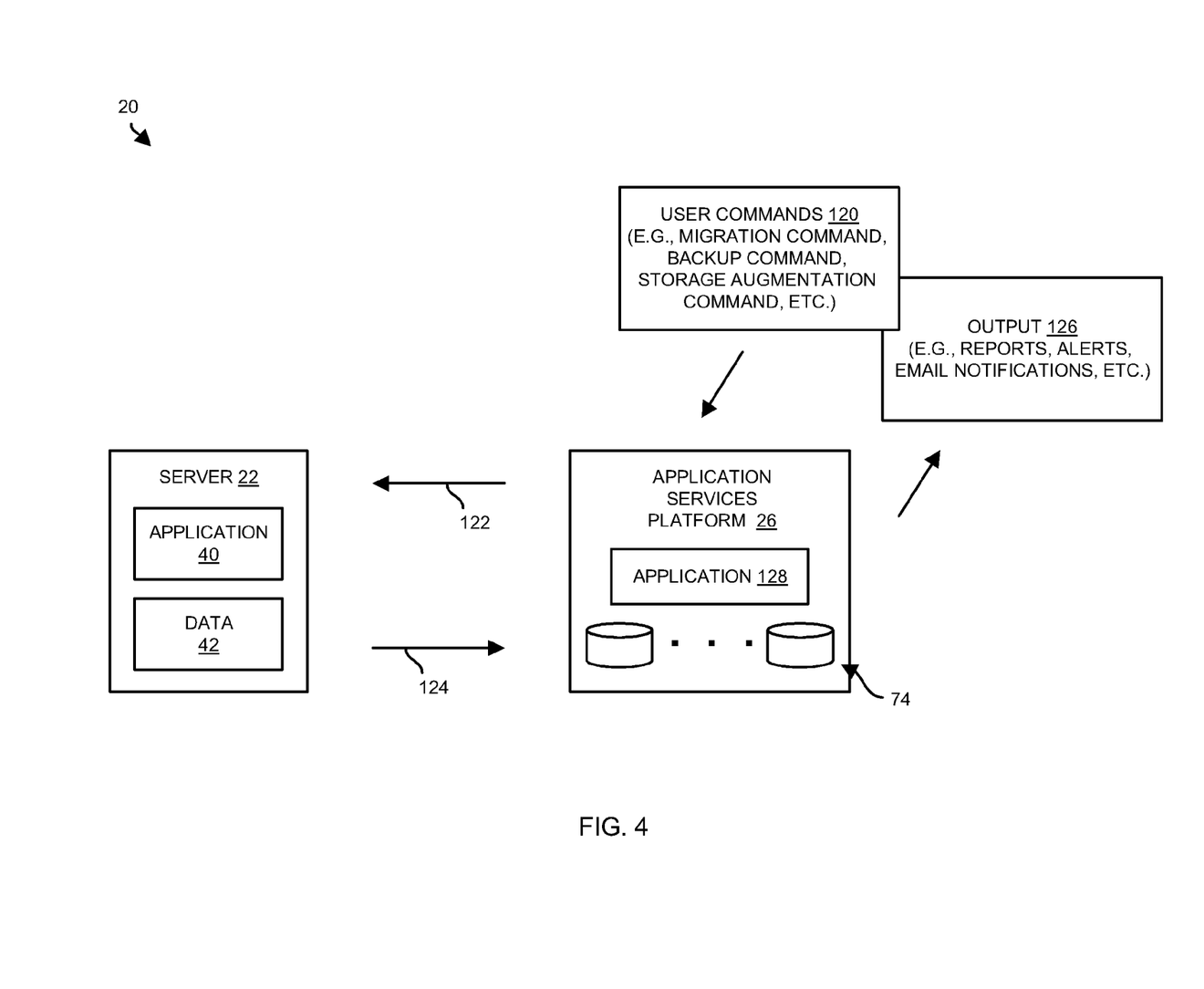
FIG. 4 is a block diagram illustrating certain application support services provided by the application services platform of FIG. 2.
Figure 5:
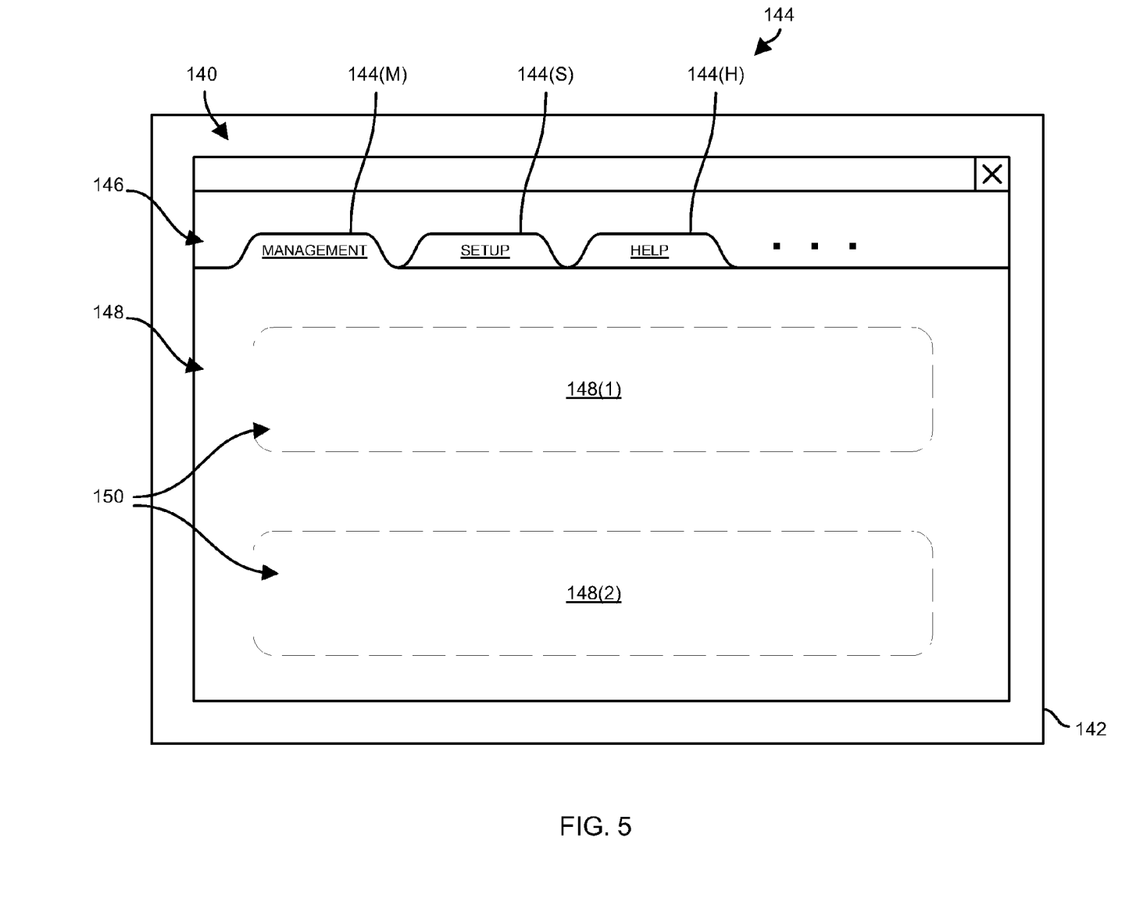
FIG. 5 is a block diagram of a web page layout which is suitable for use by the application services platform of FIG. 2.

FIGS. 4 and 5 illustrate particular aspects of user interaction with the application services platform 26. FIG. 4 illustrates how the application services platform 26 provides certain application support services to a server 22 in response to commands 120 from the user. FIG. 5 shows an example a screen layout 140 which the application services platform 26 provides to the user on a display 142, e.g., a screen of one of the user devices 24.

The user provides commands 120 (FIG. 4) to the application services platform 26 (also see step 104 in FIG. 3) by interacting with the display 142 (FIG. 5). Information on the display 142 facilitates the user's ability to effectively provide the commands 120. In particular, as illustrated in FIG. 5, the screen layout 140 provides windows 144 which give the user the ability to navigate among different features of the application services platform 26, e.g., using tabs 146 which the user can select by operating a mouse or cursor. Each window 144 provides the user with the ability to carry out certain operations. For example, a management window 144(M) enables the user to carry out certain application servicing and monitoring operations. As another example, a setup window 144(S) enables the user to carry out certain setup/configuration tasks. Additionally, a help window 144(H) provides the user with help, instructions, recommendations, etc. to aid the user. Other layouts, arrangements, tabs, etc. are suitable for use as well.

In the layout 140, each window 144 includes a set of panes 148 which enables the user to effectively interact with the application services platform 26. For example, as shown in FIG. 5, the management window 144(M) provides a discovery pane 148(1) listing applications 40 which the application services platform 26 has discovered running on the electronic system 20. The management window 144(M) further provides a task pane 148(2) which enables the user to select (e.g., in a simplified manner) particular types of application support tasks that the application services platform 26 is capable of providing to the discovered applications 40. Each pane 148 is capable of including various links or similar interfacing mechanisms 150 (shown generally by the arrow 150 in FIG. 5) that facilitate user navigation to other sources of user information.

Such a layout 140 results in a simple interface through which the user controls the application services platform 26. For example, for each discovered application 40, the user provides (i) a move command indicating whether the user wishes to move data 42 of that application 40 to new hardware of the application support platform 26, (ii) a backup command indicating whether the user wishes to backup the application data 42 on the new hardware, and (iii) a storage augmentation command indicating whether the user wishes to provide additional storage capacity for the application data 42 from the new hardware.

In response to such commands 120 or similar commands 120, the application services platform sends signals 122 to the server 22 on which the application 40 is running and receives signals 124 from the server 22, as well as provides output 126 back to the user. In this manner, the application services platform 26 coordinates its activities to carry out certain application service tasks thus enhancing the operation of the discovered application 40 and the electronic system 20 as a whole.

In some situations, the application services platform 26 is capable of communicating with the server 22 to migrate the discovered application 40 itself to the application services platform 26. To this end, the application services platform 26 installs and runs an application image 128 (FIG. 4) which is similar to the application 40 running on the server 22. As a result, the application services platform 26 is now able to contribute throughput and storage capacity, or eventually even take over entirely for the server 22 if the user decides that the application services platform 26 is better suited to run the application 40 in place of the server 22 going forward (e.g., the application services platform 26 may have faster hardware and more storage capacity than the original server 22).

At this point, it should be understood that the application services platform 26 is capable of performing a variety of specialized application management tasks. Below are a few examples of such tasks.

Report Generation

To direct the application services platform 26 to provide a report regarding a particular application 40 running on the electronic system 20, the user provides a report generation signal to the application services platform 26 (see the command 120 in FIG. 4). In response to the report generation signal, the application services platform 26 generates a report for the particular application 40 (see the output 126 in FIG. 4). The report provides configuration and performance information outlining how the particular application 40 is configured and performs when operating on the electronic system 20.

This report is capable of being viewed through the display 142, or exported for use in an analysis tool. Moreover, the report is capable of providing valuable information that may be needed by a server administrator during certain critical tasks such as migrating the application 40 itself from a server 22 to the application services platform 26 to take advantage of certain application services that the servers 22 may not be able to provide themselves (e.g., higher throughput, fault tolerance via a particular RAID level, data recovery, etc.).

Application Monitoring

To direct the application services platform 26 to monitor a particular application 40 running on the electronic system 20, the user provides a monitor signal to the application services platform 26 (see the command 120 in FIG. 4). In response, the application services platform 26 monitors operation and collects data (see the signals 122, 124 in FIG. 4).

Along these lines, the application services platform 26 can be configured to automatically send an email message to an email account of the user if it determines that a particular application 40 has failed (see the output 126 in FIG. 4). For example, if the application services platform 26 has not seen activity from a particular application 40 for a predetermined amount of time (e.g., a heartbeat) and/or the application services platform 26 has not received a response from the application 40 after a timeout period has elapsed, the application services platform 26 is capable of providing an alert email or notification to the user.

Within the alert email, the application services platform 26 preferably includes a web page link (similar to the links 150 in FIG. 5) which enables the user to navigate to appropriate web pages and immediately attend to the particular application 40 that has failed. In particular, the user clicks on the link which automatically launches a window 144 to the application services platform 26 to enable the user to access appropriate application servicing tasks.

For example, in response to a web page request generated by clicking on the link, the application services platform 26 provides an application management web page which details (i) fault information relating to the particular application 40 that has failed, and (ii) steps which have automatically been taken to preserve data of the particular application 40 (see the windows 144 in FIG. 5). Such a page is capable of informing the user that a particular disk drive has failed and that data of the particular application that resided on the particular disk drive has been recovered automatically to a hot spare disk drive (e.g., see the storage devices 72 in FIG. 4). Additionally or alternatively, such a page is capable of outputting a list of instructions arranged to instruct the user how to fix the particular application 40 that has failed (e.g., see the help window 144(H) in FIG. 5).

Additional Control

The application services platform 26 is capable of providing other application services as well. For example, the user is capable of providing a quality of service parameter to the application services platform 26 (see the command 120 in FIG. 4). The quality of service parameter defines a level of performance by a particular application 40. In response to the quality of service parameter, the application services platform 26 adjusts operation of the particular application 40 within the electronic system 20 to provide the level of performance by the particular application 40.

It should be understood that, when the application continues to run on a server 40, the application services platform 26 is able to improve certain aspects of quality of service such as response times for certain transactions if the application services platform 26 provides high speed caching for the application 40 (e.g., write back caching into semiconductor memory). Furthermore, when the application runs on the application services platform 26 itself opportunities for additional quality of service improvements exists such as prioritization/classification of requests, load balancing, and so on.

As another example, the application services platform 26 is capable of receiving a Redundant Array of Inexpensive Disks (RAID) parameter from the user for a particular application 40 (see the command 120 in FIG. 5). The RAID parameter defines a particular RAID level for storing data of the particular application 40 (e.g., RAID 0, RAID 5 and so on). In response to the RAID parameter the application services platform 26 stores the data of the particular application 40 in compliance with the RAID level parameter.

Figure 6:
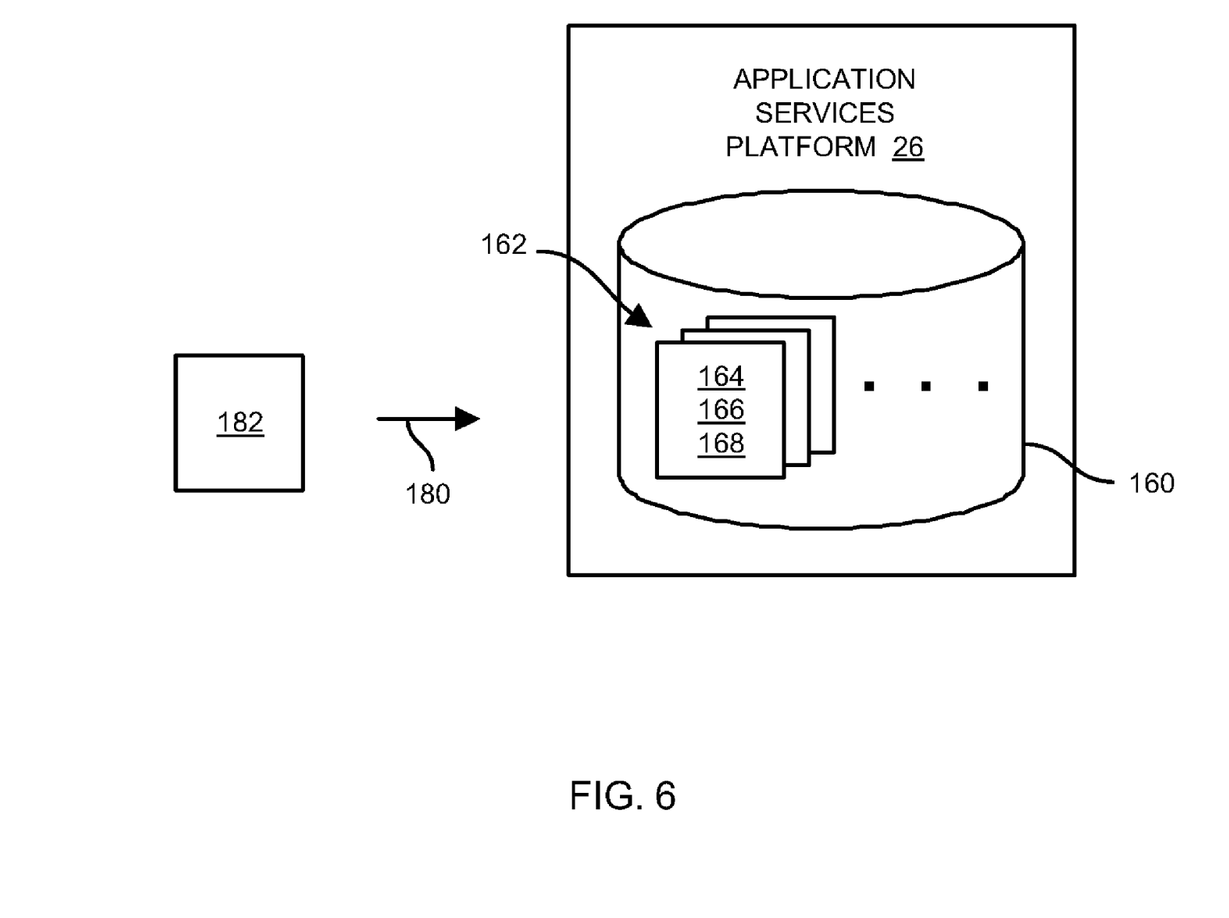
FIG. 6 is a block diagram of a supported-applications database of the application services platform of FIG. 2.

Further details will now be provided with reference to FIG. 6.

FIG. 6 shows a supported-applications database 160 which is maintained by the control circuitry 62 of the application services platform 26 (also see the other information 70 in FIG. 2). The supported-applications database 160 includes individual entries 162 corresponding to the applications 40 which the application services platform 26 is able to support. In particular, each entry 162 of the database 160 includes certain application specific information that enables the application services platform 26 to discover, provision and manage a particular application 40. Such information includes application pre-loaded application information 164, application information 166 that the application services platform 26 has accumulated over time by monitoring the communications fabric 28, and user-entered information 168 that has been added by the user.

In connection with the pre-loaded application information 164, such information 164 may include profile information which enables the application services platform 26 to properly communicate with the application 40 (e.g., validation, authentication, licensing, and security handshaking), specialized routines which enable the application services platform 26 to directly provision and manage certain operations of the application 40 (e.g., migration, backups, storage augmentation, application monitoring, fault handing, etc.), and management and support tools (e.g., recommended hardware requirements, recommended runtime provisions, tools for performance analysis, etc.).

It should be understood that the application services platform 26 is capable of receiving an external update request signal 180, and automatically updating the supported-applications database 160 with application information 182 (e.g., a new set of recommended provisions) in response to the external update request signal 180. Such a signal 180 may be automatically received in the form of periodic online updates, or obtained upon request by the user, or by other means (e.g., loading a CD-ROM, downloading from the network, etc.). Along these lines, application vendors may even offer the pre-loaded application information 164, 180 via an established value added reseller (VAR) agreement/relationship with the manufacturer/supplier of the application services platform 26. Such information 164, 180 is capable of being entered into the database 160 at the time of initial integration, at a subsequent time or both.

In connection with the run-time accumulated application information 166, such information 166 may include specific configuration details that the application services platform 26 has detected over time. Such information 166 may include specific configuration information (e.g., device network addresses, usernames, particular protocols in use, etc.), performance statistics (e.g., measured throughput/traffic, response times, frequencies of use, etc.), and recommendations generated by the application services platform 26 to improve performance and efficiency.

In connection with the user-entered application information 168, such information 168 may include commands and data that the user has entered during operation of the application services platform 26. Such information 166 may include the current configuration for the application 40 (e.g., where the application 40 resides, how the application 40 is configured to run, where the application data 42 resides, authorized users, passwords, allocated storage capacities, etc.), commands directing how the application services platform 26 should operate under certain situations (e.g., to guarantee a particular quality of service, to implement a certain RAID level, to carry out backups, to detect/correct certain types of faults, etc.).

In all, the various entries 162 containing the information 164, 166, 168 within the supported-applications database 160 are accessible by the user via the earlier-described user interaction (also see FIGS. 4 and 5). For example, the user is capable of obtaining, from the database 160, a set of recommended provisions or following a set of fault recovery instructions for a particular application 40 by accessing the database information through one of the user devices 24. Such user management of the applications 40 does not penalize the servers 22 since management occurs from the application services platform 26 without taxing the servers 22.

Figure 7:
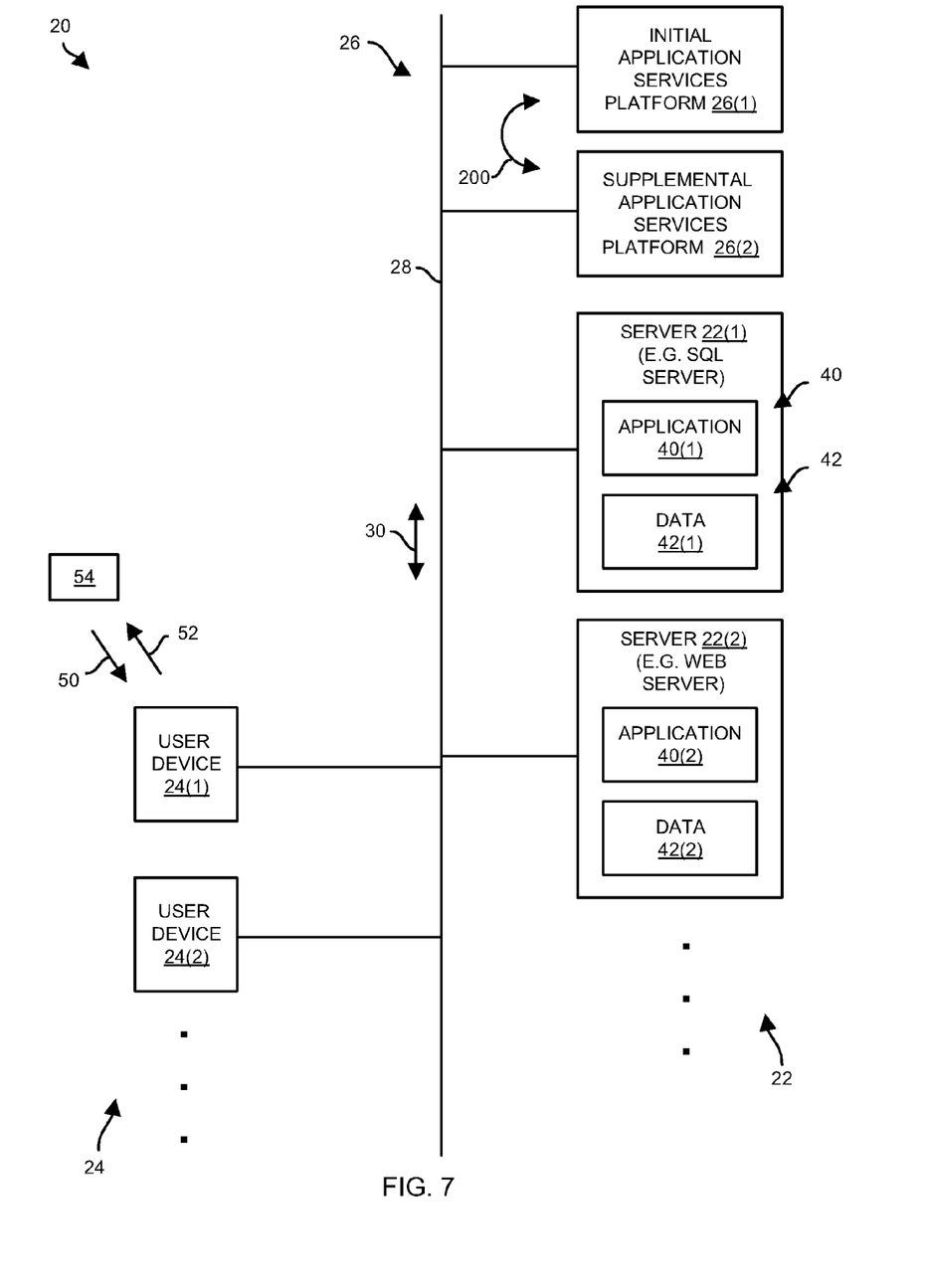
FIG. 7 is a block diagram of the electronic system of FIG. 1 with multiple application services platforms.

Further details will now be provided with reference to FIG. 7.

FIG. 7 shows the electronic system 20 with multiple application services platforms 26. Here, after the electronic system 20 has operated for a period of time with an initial application services platform 26(1), the user adds a second application services platform 26(2). Perhaps the initial application services platform 26(1) has increased the number of managed applications 40 over time and the additional hardware 26(2) has been added in a supplemental manner to maintain robust and reliable integrated, unified control over the many applications 40.

In some arrangements, the application services platforms 26 are arranged to carry out an auto-discovery procedure by exchanging signals 200. In particular, the second application services platform 26(2) transmits a new hardware signal onto the communications fabric 28. The new hardware signal indicates that additional new hardware has been added to the electronic system 20. The initial application services platform 26(1) receives the new hardware signal and responds by automatically re-running at least a portion of the procedure 100 (also see FIG. 3). That is, the application services platform 26(1) which may now be the primary or master of multiple application services platforms 26, re-lists the set of applications 40 that it knows about on the electronic system 20, and queries the user for new instructions (e.g., new user commands 120).

Accordingly, the user is able to direct the application services platforms 26 to carryout various application service tasks such as migration, backup and storage capacity augmentation but with the additional hardware in mind. With multiple application services platforms 26 enabling application operation, additional flexibility may now be available such as certain types of mirroring, load balancing and fault handling. Further details will now be provided with reference to FIG. 8.

Figure 8:
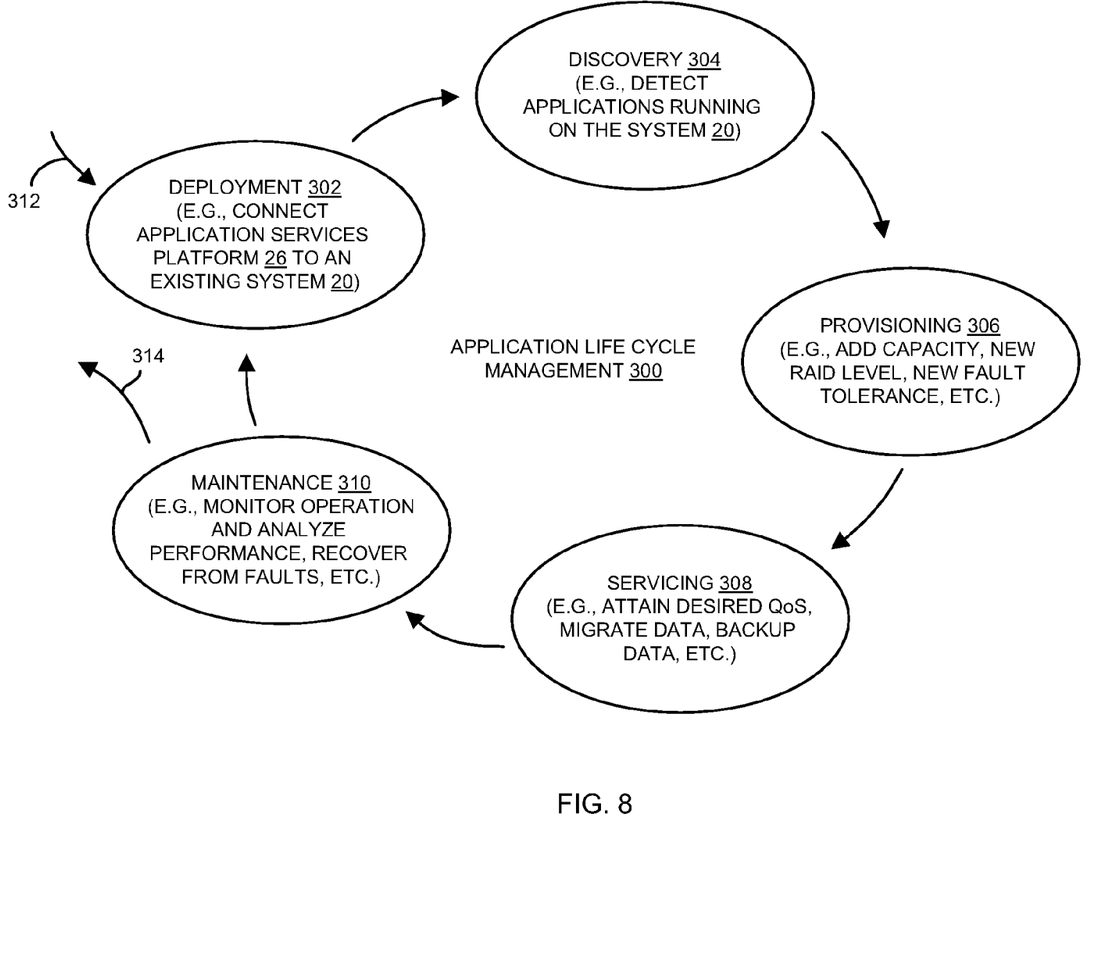
FIG. 8 is a general diagram illustrating the abilities of the application services platform of FIG. 2 to manage the life cycle of applications over time.

FIG. 8 provides a pictorial view 300 of the application awareness and management capabilities offered by the presence of one or more application services platforms 26 in the electronic system 20. Based on the pictorial view, it should be clear that the application services platform(s) 26 robustly and reliably support and manage the life cycle of the various applications 40 over time.

As shown in FIG. 8, the various features include deployment 302, discovery 304, provisioning 306, servicing 308, and maintenance 310 all of which are made available by the application services platform 26. Deployment 302 involves initially connecting each application services platform 26 to the electronic system 20 (also see FIG. 1). Discovery 304 involves detecting the applications 40 that are currently running on the servers 22 of the electronic system 20 and informing the user (also see step 102 of FIG. 3). Provisioning 306 involves providing certain application services to the electronic system 20 to improve performance, e.g., adding storage capacity, including new functionality such as particular RAID level implementation, disaster recovery, and so on (also see FIG. 4). Servicing 308 involves providing other application services to the electronic system 20 such as (i) additional processing power to impart a particular quality of service (QoS), (ii) migration of the application 40 and/or data 42, (iii) backing up of the application 40 and/or data 42, and (iv) adding support for new applications 40, among other things (also see FIGS. 4 and 6). Maintenance 310 involves ongoing operation of the application services platform 26 such as monitoring and analyzing application performance, detection and notification of faults, application and data recovery, etc. (also see FIG. 7).

It should be understood that deployment 302 can take place when the user initially adds a first application services platform 26 to an electronic system 20 (see the arrow 312). The user may have began a business operation with entry-level equipment and now faces the need to upgrade.

However, deployment 302 can also follow maintenance 310 such as when adding another application services platform 26 for flexibility and enhanced operation (e.g., see FIG. 7). Here, the user may have operated with the first application services platform 26 for a period of time but now wishes to further scale the electronic system 20 due to greater demands.

It should be further understood that maintenance 310 can also be followed by other operations 314 such as un-deployment which is handled by the application services platform 26. For example, the user is capable of sending the application services platform 26 an un-deploy command 120 for a particular application 40 (also see FIG. 4). In response to such a command 120, the application services platform 26 scrubs data for the particular application 40 and/or cleanly de-sinstalls the application 40 from the electronic system 20.

As described above, an improved technique for supporting application operation is carried out distinctly from the conventional operating system services and security protection services traditionally found in a server. In particular, from a separate application services platform 26, application support tasks such as application discovery, provisioning, and management are capable of being carried out. Such application awareness and control is preferably presented to a user 54 as an integrated, unified user interface 140 which can contemporaneously oversee the life cycle of multiple applications 40.

While various embodiments of the invention have been particularly shown and described, it will be understood by those skilled in the art that various changes in form and details may be made therein without departing from the spirit and scope of the invention as defined by the appended claims.

For example, the applications 40 described above included a SQL application and a web application by way of example only. Other types of applications are suitable for use as well such as other database server applications, other web applications, email server applications, file server applications, security server applications, network server applications, specialized applications, and so on.

What is claimed is:

1. A method to support application operation, the method comprising:

discovering a set of applications running on an electronic system;

querying a user to identify which of the set of applications the user wishes to manage; and for each application identified by the user, providing an application service to that application to support operation of that application, the application service being separate from operating system services and security protection services provided by the electronic system;

wherein querying the user includes:

listing the set of applications on a display to the user; and receiving, for each application, (i) a move command indicating whether the user wishes to move data of that application to new hardware of the electronic system, (ii) a backup command indicating whether the user wishes to backup the data of that application on the new hardware of the electronic system, and (iii) a storage augmentation command indicating whether the user wishes to provide additional storage capacity for the data of that application from the new hardware of the electronic system, wherein providing an application service includes installing and running an application image of the application on the new hardware of the electronic system to contribute to throughput of the application, the application image being similar to an application running on the electronic system, wherein the method further comprises accessing a supported applications database, the supported applications database including an individual entry for each supported application, wherein each entry includes:
preloaded application information, including profile information that enables communication with the application, specialized routines that enable provisioning and management of the application, and management and support tools for the application,
application information accumulated over time, including application configuration information, performance statistics, and recommendations to improve performance, and
user entered application information, including current configuration information and commands directing how operation various situations,
wherein the preloaded application information, the application information accumulated over time, and the user entered application information are accessible by the user.

2. A method as in claim 1 wherein providing the application service includes:
migrating data of a particular application from older hardware of the electronic system to the new hardware of the electronic system in response to a move command indicating that the user wishes to move the data of the particular application from the older hardware of the electronic system to the new hardware of the electronic system.

3. A method as in claim 1 wherein providing the application service includes:
backing up the data of a particular application onto the new hardware of the electronic system in response to a backup command indicating that the user wishes to backup the data of the particular application onto the new hardware of the electronic system.

4. A method as in claim 1 wherein providing the application service includes:
providing additional storage capacity for the data of a particular application from the new hardware of the electronic system in response to a storage augmentation command indicating that the user wishes to provide additional storage capacity for the data of the particular application.

5. A method as in claim 1, further comprising:
receiving a new hardware signal indicating that additional new hardware has been added to the electronic system; and
in response to the new hardware signal indicating that the additional new hardware has been added to the electronic system:
re-listing the set of applications on the display to the user, and
receiving, for each application, (i) another move command indicating whether the user wishes to move the data of that application to the additional new hardware of the electronic system, (ii) another backup command indicating whether the user wishes to backup the data of that application on the additional new hardware of the electronic system, and (iii) another storage augmentation command indicating whether the user wishes to provide additional storage capacity for the data of that application from the additional new hardware of the electronic system.

6. A method as in claim 1, further comprising:
receiving a report generation signal which requests a report for a particular application of the set of applications; and
in response to the report generation signal, generating the report for the particular application, the report providing configuration and performance information outlining how the particular application is configured and performs when operating on the electronic system.

7. A method as in claim 1, further comprising:
monitoring a particular application; and
in response to detection that the particular application has failed, automatically sending an alert email message to an email account of the user.

8. A method as in claim 7 wherein automatically detecting and sending the alert email message includes:
providing, in the alert email message, a web page link which enables the user to attend to the particular application that has failed.

9. A method as in claim 8, further comprising:
in response to a web page request containing the web page link from the user, providing an application management web page which details (i) fault information relating to the particular application of the set of applications that has failed, and (ii) steps which have automatically been taken to preserve data of the particular application.

10. A method as in claim 9 wherein the electronic system includes a particular disk drive and a hot spare disk drive; and wherein providing the application management web page includes:
informing the user of that the particular disk drive has failed and that data of the particular application that resided on the particular disk drive has been recovered automatically to the hot spare disk drive.

11. A method as in claim 9 wherein providing the application management web page includes:
outputting a list of instructions arranged to instruct the user how to fix the particular application that has failed.

12. A method as in claim 1, further comprising:
receiving a quality of service parameter from the user for a particular application, the quality of service parameter defining a level of performance by the particular application; and
adjusting operation of the particular application within the electronic system to provide the level of performance by the particular application in response to the quality of service parameter from the user.

13. A method as in claim 1, further comprising:
receiving a Redundant Array of Inexpensive Disks (RAID) parameter from the user for a particular application, the RAID parameter defining a RAID level for storing data of the particular application; and
storing the data of the particular application in compliance with the RAID level in response to the RAID parameter from the user.

14. A method as in claim 1 wherein listing the set of applications on the display to the user includes rendering the list on a user interface to the user; and wherein the method further comprises:
retrieving, from a supported-applications database, a set of recommended provisions for a particular application on the list, and
rendering the set of recommended provisions for the particular application on the list on the user interface to the user.

15. A method as in claim 14, further comprising:
receiving an external update request signal; and
automatically updating the supported-applications database with a new set of recommended provisions in response to the external update request signal.

16. A method as in claim 14 wherein the set of applications includes multiple third-party applications; and wherein the method further comprises:

providing the user with integrated; unified control over the multiple third-party applications via user interaction with the user interface.

17. A method as in claim 14, further comprising:

receiving an un-deploy command for the particular application from the user through the user interface; and scrubbing data for the particular application from the electronic system in response to the un-deploy command.

18. An electronic system, comprising:

a set of servers;

an input/output (I/O) device including a display and input equipment; and control circuitry coupled to the set of servers and the I/O device, the control circuitry being arranged to:

discover a set of applications running on the set of servers, query a user through the I/O device to identify which of the set of applications the user wishes to manage, for each application identified by the user, providing an application service to that application to support operation of that application, the application service being separate from operating system services and security protection services provided by the set of servers, when querying the user, list the set of applications on the display to the user and through the input equipment, receive, for each application, (i) a move command indicating whether the user wishes to move data of that application to new hardware, (ii) a backup command indicating whether the user wishes to backup the data of that application on the new hardware, and (iii) a storage augmentation command indicating whether the user wishes to provide additional storage capacity for the data of that application from the new hardware, run an application image of at least one application of the set of applications using hardware and memory of the control circuitry, the application image being similar to an application running on the set of servers, wherein the control circuitry contributes to throughput of the application, and access a supported applications database, the supported applications database including an individual entry for each supported application, wherein each entry includes:

preloaded application information, including profile information that enables communication with the application, specialized routines that enable provisioning and management of the application, and management and support tools for the application, application information accumulated over time, including application configuration information, performance statistics, and recommendations to improve performance, and user entered application information, including current configuration information and commands directing how operation various situations, wherein the preloaded application information, the application information accumulated over time, and the user entered application information are accessible by the user via the I/O device.

19. The electronic system of claim 18, wherein the control circuitry is further arranged to run the application image in place of the application running on the set of servers.

20. The electronic system of claim 18, wherein the control circuitry provides high speed caching for running the application image, including write-back caching into semiconductor memory.

* * * * *